United States Patent
Watts et al.

(10) Patent No.: US 6,732,207 B2
(45) Date of Patent: May 4, 2004

(54) FAST SERIAL INTERFACE USED FOR CONTROLLER TO ROBOT COMMUNICATIONS

(75) Inventors: Gary Watts, San Jose, CA (US); Goran Relic, Milpitas, CA (US)

(73) Assignee: PRI Automation, Inc., Billerica, MA (US)

( * ) Notice: Subject to any disclaimer, the term of this patent is extended or adjusted under 35 U.S.C. 154(b) by 439 days.

(21) Appl. No.: 09/918,973

(22) Filed: Jul. 31, 2001

(65) Prior Publication Data

US 2003/0070025 A1 Apr. 10, 2003

(51) Int. Cl.[7] ............................................... G06F 13/40
(52) U.S. Cl. .................... 710/105; 710/300; 318/568.11
(58) Field of Search ........................ 710/105, 62, 300, 710/106, 260, 305; 318/568.11; 340/825; 714/800; 700/90; 370/236, 463, 402, 912; 375/220; 709/253

(56) References Cited

U.S. PATENT DOCUMENTS

| | | | | |
|---|---|---|---|---|
| 4,719,621 A | * | 1/1988 | May ............................ | 370/402 |
| 4,785,396 A | * | 11/1988 | Murphy et al. ............. | 710/106 |
| 4,965,793 A | * | 10/1990 | Polzin et al. ................ | 370/236 |
| 5,892,956 A | * | 4/1999 | Qureshi et al. ............. | 710/260 |
| 6,472,838 B1 | * | 10/2002 | Shikazono et al. ......... | 318/567 |

OTHER PUBLICATIONS

"A dynamic high speed multi-media local area network (MLAN) protocol architecture" by J. P. Agrawal and U. Varshney (Abstract only).*

* cited by examiner

*Primary Examiner*—Gopal C. Ray
(74) *Attorney, Agent, or Firm*—Weingarten, Schurgin, Gagnebin & Lebovici LLP

(57) ABSTRACT

A fast serial interface including a three-wire network connection between a bus controller and one or more bus devices is disclosed. The bus controller processes and issues data packets across the three-wire network that include a command code, a bus device selection code, and a bus device register selection code. If the command code corresponds to write code, then the selected bus device stores the data contained within the packet in the selected register. If the command code corresponds to a read command, the selected bus device retrieves the data stored in the selected register, forms a read data packet and transfers the read data packet to the bus controller.

15 Claims, 8 Drawing Sheets

130A

| BIT | WRITE FUNCTION | READ FUNCTION |
|---|---|---|
| 7 | Reset CMD MSB | CMD MSB |
| 6 | Reset CMD LSB | CMD LSB |
| 5 | DS2 Bus Device Select MSB | Bus Device Select MSB |
| 4 | DS1 | DS1 |
| 3 | DS0 Bus Device Select LSB | DS0 Bus Device Select LSB |
| 2 | RS2 Register Select MSB | RS2 Register Select MSB |
| 1 | RS1 | RS1 |
| 0 | RS0 Register Select LSB | RS0 Register Select LSB |

| BIT | WRITE FUNCTION | READ FUNCTION |
|---|---|---|
| 7 | CMD MSB | 1=Command Complete |
| 6 | CMD LSB | 1=Bus Device Interrupt Request |
| 5 | DS2 Bus Device Select MSB | DS2 |
| 4 | DS1 | DS1 |
| 3 | DS0 Bus Device Select LSB | DS0 Bus Device Select LSB |
| 2 | RS2 Register Select MSB | EC2 Error Code MSB |
| 1 | RS1 | EC1 Error Code |
| 0 | RS0 Register Select LSB | EC0 Error Code LSB |

*FIG. 2B*

| BIT | WRITE FUNCTION | READ FUNCTION |
|---|---|---|
| 7 | N/A | Interrupt Overrun Error |
| 6 | N/A | Servo A Following Error |
| 5 | N/A | Servo B Following Error |
| 4 | N/A | Bus Sync Error |
| 3 | N/A | Internal Parity or CRC Error |
| 2 | Force Calculated Parity Error | Calculated Bus Write Perr |
| 1 | Force Calculated Parity Calc. | Self Test Error |
| 0 | Force Cacade Collision Error | Bus Collision Error |

| BIT | WRITE FUNCTION | READ FUNCTION |
|---|---|---|
| 7 | N/A | Board Config MSB |
| 6 | N/A | Board Config middle bit |
| 5 | N/A | Board Config LSB |
| 4 | N/A | Xilink Config MSB |
| 3 | N/A | Xilinx Config middle bit |
| 2 | N/A | Xilinx Config LSB |
| 1 | N/A | Board Revision MSB |
| 0 | N/A | Board Revision LSB |

| BIT | WRITE FUNCTION | READ FUNCTION |
|---|---|---|
| 7 | Output Bit 7 | Read what you wrote |
| 6 | Output Bit 6 | " |
| 5 | Output Bit 5 | " |
| 4 | Output Bit 4 | " |
| 3 | Output Bit 3 | " |
| 2 | Output Bit 2 | " |
| 1 | Output Bit 1 | " |
| 0 | Output Bit 0 | " |

*FIG. 7A*

| BIT | WRITE FUNCTION | READ FUNCTION |
|---|---|---|
| 7 | Output Bit 15 | Read what you wrote |
| 6 | Output Bit 14 | " |
| 5 | Output Bit 13 | " |
| 4 | Output Bit 12 | " |
| 3 | Output Bit 11 | " |
| 2 | Output Bit 10 | " |
| 1 | Output Bit 9 | " |
| 0 | Output Bit 8 | " |

*FIG. 7B*

| BIT | WRITE FUNCTION | READ FUNCTION |
|---|---|---|
| 7 | N/A | Input Bit 7 |
| 6 | N/A | Input Bit 6 |
| 5 | N/A | Input Bit 5 |
| 4 | N/A | Input Bit 4 |
| 3 | N/A | Input Bit 3 |
| 2 | N/A | Input Bit 2 |
| 1 | N/A | Input Bit 1 |
| 0 | N/A | Input Bit 0 |

*FIG. 8*

| BIT | WRITE FUNCTION | READ FUNCTION |
|---|---|---|
| 7 | Interupt Enable Bit 7 | Read what you wrote |
| 6 | Interupt Enable Bit 6 | " |
| 5 | Interupt Enable Bit 5 | " |
| 4 | Interupt Enable Bit 4 | " |
| 3 | Interupt Enable Bit 3 | " |
| 2 | Interupt Enable Bit 2 | " |
| 1 | Interupt Enable Bit 1 | " |
| 0 | Interupt Enable Bit 0 | " |

*FIG. 9*

| BIT | WRITE FUNCTION | READ FUNCTION |
|---|---|---|
| 7 | Pointer Freeze (no increment) | Read what you wrote |
| 6 | MSB Pointer | Current Pointer Value MSB |
| 5 | Note: Addresses 0-63 | |
| 4 | reserved for external devices | |
| 3 | Addresses 64-128 reserved for | |
| 2 | internal registers (such as | |
| 1 | 4 channel A/D converter) | |
| 0 | LSB Pointer | Current Pointer LSB |

*FIG. 10*

FAST SERIAL INTERFACE USED FOR CONTROLLER TO ROBOT COMMUNICATIONS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Control of industrial robots requires high speed data lines for transmitting commands to the various robot systems from the robot controller and for receiving status data of the various robot systems by the robot controller. Typically, current robot controllers utilize one or more high speed parallel data busses to communicate to and from the robot.

High speed parallel data buses require a single conductor for each data bit that is to be transferred to or from the various robot systems and the robot controller. For a high density and high speed transmission system there will be numerous conductors running between the robot controller and the various robot systems. Also, in addition to the data carrying conductors, a number of conductors will be required to carry overhead data such as read and write commands and system select commands. As the chassis and the physical size of various systems continues to decrease, space becomes a more valuable commodity. The use of a parallel data transmission system requires an increased pin count as more systems are linked together and/or larger data words are used. This increased pin count will result in larger interface interference between the pins and conductors that will need to be in close proximity to one another will increase as well. This increase in interference can result in increased complexity in terms of circuits and systems and increase the cost of these systems as well. In addition, as the physically available space decreases, the amount of space taken up by parallel conductor runs inside the chassis can reduce the internal air flow resulting in increased complexity and cost to ensure that proper cooling occurs. Also, purchasing, installing, maintaining, and trouble shooting multiple conductor parallel data communication can be a costly investment for any system. In addition, the time required to trouble shoot a malfunctioning parallel communication system increases with the number of conductors carrying data.

Therefore what is needed in the art is a simple data interface system that is easy to route within a chassis, robust in its ability to carry high speed data, and able to perform data error checking.

BRIEF SUMMARY OF THE INVENTION

A fast serial interface including a three-wire network connection between a bus controller and one or more bus devices is disclosed. The bus controller processes and issues data packets across the three-wire network that include a command code, a bus device selection code, and a bus device register selection code. If the command code corresponds to write code, then the selected bus device stores the data contained within the packet in the selected register. If the command code corresponds to a read command, the selected bus device retrieves the data stored in the selected register, forms a read data packet and transfers the read data packet to the bus controller.

Additional aspects, features and advantages of the present invention are also described in the following Detailed Description.

BRIEF DESCRIPTION OF THE SEVERAL VIEWS OF THE DRAWING

The invention will be more fully understood by reference to the following Detailed Description of the Invention in conjunction with the drawings of which:

FIGS. 2A and 2B are schematic representations of the two interpretations of the control and status registers of FIG. 1;

FIGS. 6A and 6B are schematic representations of the bus device status register and configuration register of FIG. 1;

FIGS. 7A and 7B are schematic representations of the bus device data output register of FIG. 1;

FIG. 8 is a schematic representations of the bus device data input register of FIG. 1;

FIG. 9 is a schematic representations of the bus device interrupt mask register of FIG. 1;

FIG. 10 is a schematic representations of the bus device pointer register of FIG. 1;

DETAILED DESCRIPTION OF THE INVENTION

Figure 1:
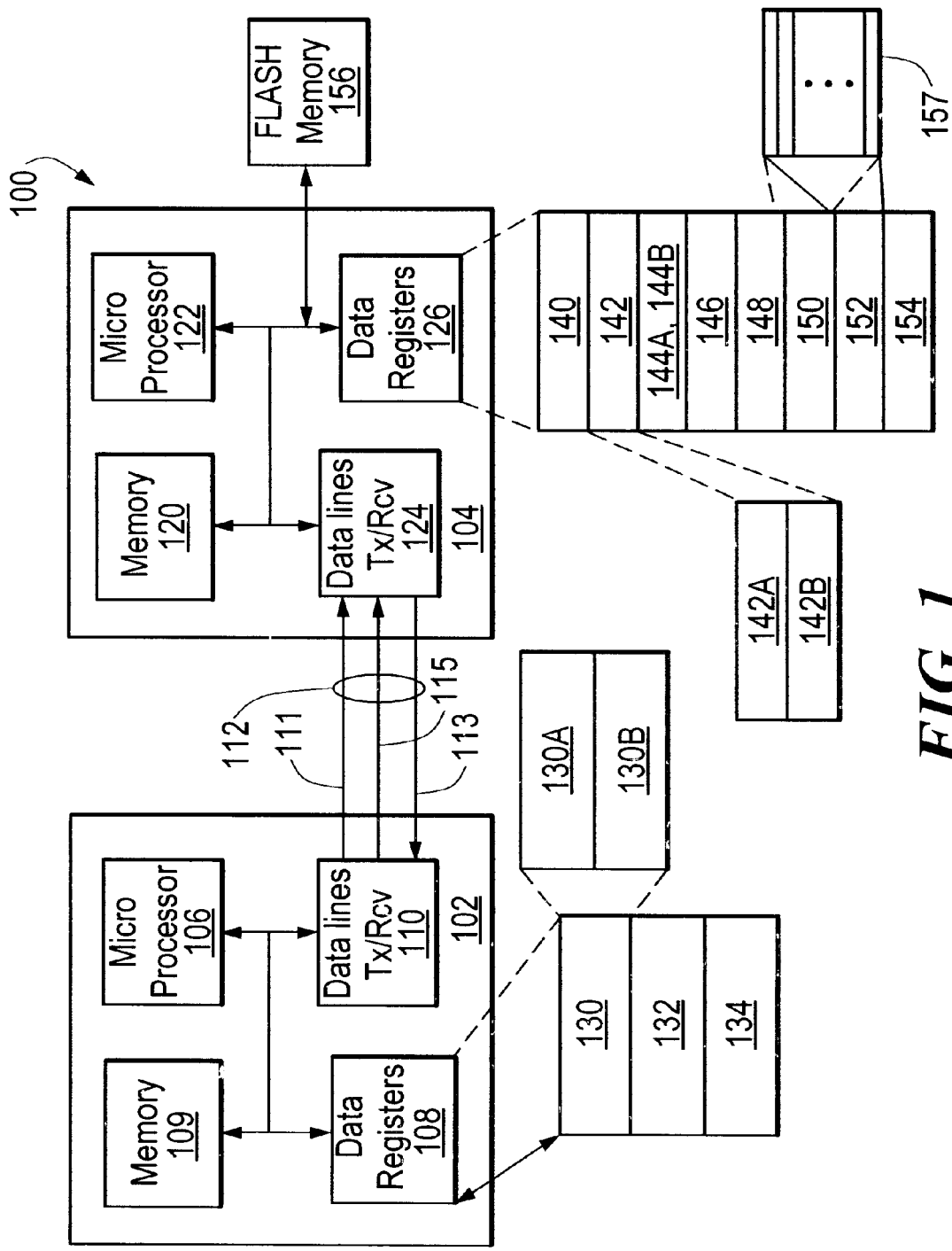
FIG. 1 is a block diagram of a serial interface consistent with the present invention.

FIG. 1 depicts a three-wire serial network 100 suitable for use with the presently described serial communications system between a bus controller and a bus device. The network 100 includes a bus controller 102 coupled to a bus device 104 via a three wire network connection 112. The three-wire network connection 112 includes a transmit wire 111, for transferring data packets from the bus controller to a bus device, a return wire 113, for transmitting data packets from a bus device to the bus controller, and a clock line 115 for providing a clock signal from the bus controller to the bus device.

There can be a plurality of bus devices (not shown) that may be connected in parallel (not shown) to the three-wire network connection 112, or one or more bus devices may be connected in a cascade fashion (not shown), wherein the three-wire network connection 112 is passed through each bus device to a subsequent bus device. Alternatively, there may be two or more network devices connected to the three-wire network connection in parallel (not shown) wherein one or more of the network devices may have other devices connected in a cascade manner to them (not shown).

The bus controller 102 and the bus device 104 both include a processor 106/122, respectively, coupled to a memory 109/120, respectively, a data-transmit-receive-network-interface 110/124, respectively, and a plurality of data registers 108/126, respectively. The data transmit-receive network interface 110 provides the necessary signal conditioning, the appropriate signals level, the necessary filtering and signal detection for the data transmitted and received from the network. The memory 111 provides a plurality of data storage locations to store various software programs and the data associated therewith. The plurality of control and data registers 104 and 126 respectively, provide device control and status data, network overhead data, and system data for the bus controller 102 and the bus device 104. As described in more detail below, the processor 106/122 and the data-transmit-receive-network-interface 110/120 utilize the data contained in the various data registers 108/126 to form a data packet for transmission over the three-wire network connection 112.

A data packet is transmitted between the various network components, and the interpretation of the various bytes comprising the packet changes if the packet is providing a "data out" function, i.e., when data is being transmitted from the bus controller to one or more bus devices, or a "data in" function, i.e., when data is being transmitted from a bus device to the bus controller. The table below illustrates the data packet used within the current serial communication system:

TABLE 1

| Bits | Data Out | Data In |
|---|---|---|
| 0, 1, 2 | Synchronization Bits, in a 101 pattern | Tri state condition |
| 3, 4 | Command being asserted to the bus: 01 read data from bus device; 10 write data to a bus device, 11 reset, 00 null | Status bit 7 and 6, Status for each device, and the status for that bit time corresponding to the devices' physical address |
| 5, 6, 7 | Physical bus device Select, up to eight devices may exist | Status bits |
| 8, 9, 10 | Register select within the selected physical bus device | Status bits |
| 11 | Asserted as zero, used for wait state | Asserted by downstream device as a request to open a gateway to the bus for bits 12–19 (Read data) and bits 20–22 parity or collision error |
| 12–19 | Write data bits 7–0 | Read data bits 7–0 |
| 20 | Even parity assertion by bus controller for bits 0–19 | Calculated even parity asserted by the selected bus device for data in bits 12–19, this is compared to the incoming parity error and report a difference in bit 21 |
| 21 | Parity calculation error asserted by the bus controller | Parity error asserted by the bus device |
| 22 | Bus collision at the parallel connection as detected by the bus controller. Prior command is ignored. | Collision detected by the bus device in the cascaded configuration |
| 23–25 | Null, no clock | Null, no clock |

Accordingly, the bus controller 104 is able to write or read data to/from any of the plurality of registers of the bus devices 102 by appropriately setting the appropriate bits in the packet. In this way, the bus controller can receive stored data by reading the appropriate register within a selected bus device and control the bus device by writing data to the appropriate control register within the selected bus device. Also, each of the registers has a different interpretation depending on whether the function is a data out (write data) function or a data in (read data) function.

In the embodiment depicted in FIG. 1, the network controller includes three control and data registers 108 corresponding to a controller and status register 130, a network device status register 132, and a data port register 134.

The control and status register 130 contains data relating to the selection of a particular bus device and a particular register thereof. The interpretation of the control and status register 130 depends on the last command executed. If the last command was a reset command, then the interpretation of the controller and status register 130A is provided in FIG. 2A. If the last command was not a reset command then the interpretation of the controller and status register 130B is provided in FIG. 2B.

As depicted in FIG. 2A the last command was a reset command and the interpretation of the of the first 6 bits, bits 0–5, select the register and the bus device in both the write data and read data functions. In particular, bits 0–2 select the register, and bits 3–5 select the bus device. Bits 6 and 7 store the appropriate command bits as discussed in Table 1 above. As such, If the function to be performed is a write function, then bits 6 and 7 contain the reset command LSB and MSB, i.e., 1, 1 respectively. If the command is a read function then bits 6 and 7 contain the command bits LSB and MSB respectively.

If the last command was not a reset command then as depicted in FIG. 2B, the first 6 bits, bits 0–5, select the register and the bus device as described above in the data out (write function). In particular, bits 0–2 select the register, and bits 3–5 select the bus device. If it is a data in (read) function that is being performed, bits 0–2 provide a three bit error code, and bits 3–5 provide the address of the device selected. In particular, the error codes are given by:

TABLE 2

| Error Code | Meaning |
|---|---|
| 000 | No errors on bus transaction |
| 001 | Write parity error |
| 010 | Read parity error |
| 100 | Command collision |
| 101 | Write parity error retry failure (3 retries and failed) |
| 110 | Read parity error retry failure (3 retries and failed) |
| 111 | Bus Collision |

In addition, if a write function is being performed bits 6 and 7 contain the command least significant bit and most significant bit respectively. If a read function is to be performed, bit 6 contains a bus device interrupt request when set to 1 and bit 7 contains a command complete flag when set to 1.

Figure 3:
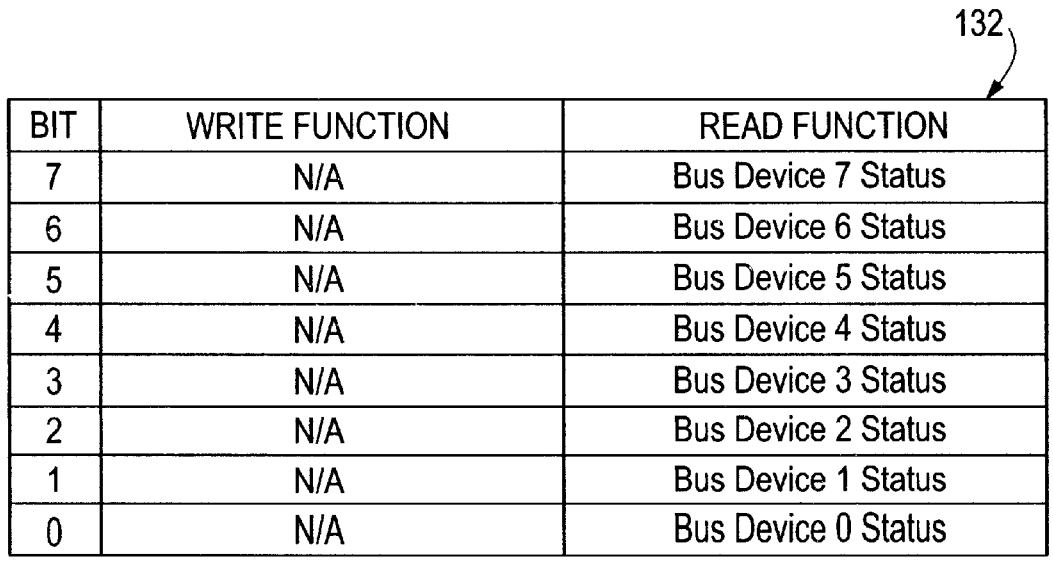
FIG. 3 is a schematic representations of the bus controller status register of FIG. 1.

As depicted in FIG. 3 the bus device status register 132 contains 7 bits. There are no defined functions if the function to be performed is a write function for bits 0–7, however, if a read function is being performed then each bit contains a device status bit of a corresponding predetermined bus device. As depicted in FIG. 3, there can be up to 8 bus devices attached to the bus controller.

Figure 4:
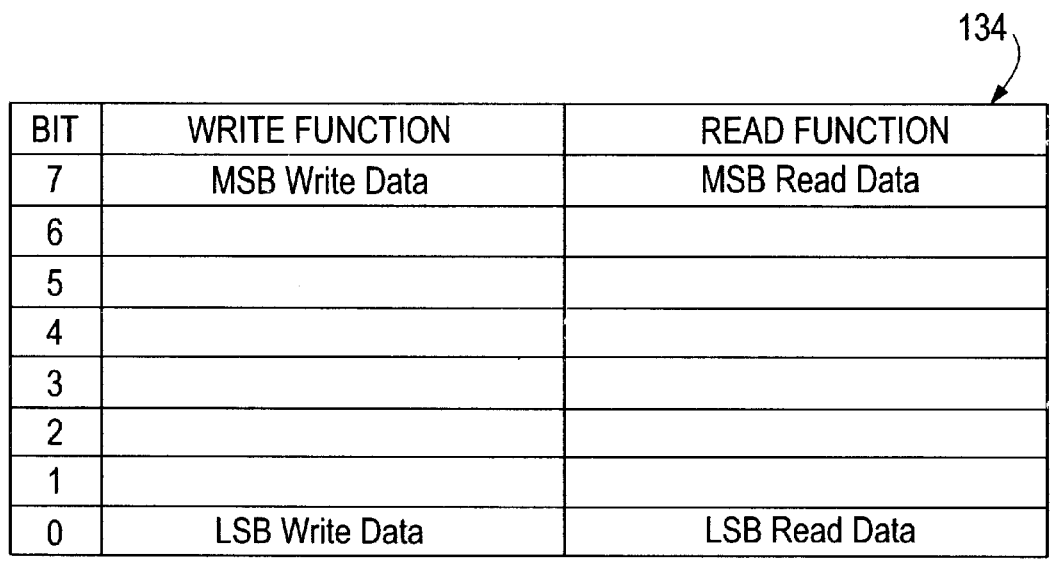
FIG. 4 is a schematic representations of the bus controller data register of FIG. 1.

FIG. 4 depicts the bus controller data port register 134. If a write function is to be performed the data to be written to the particular bus device and register are contained in bits 0–7. If a read function is being performed the data from a particular device register is placed in bits 0–7 of this register.

Figure 5:
FIG. 5 is a schematic representations of the bus device status register of FIG. 1.
Figure 11:
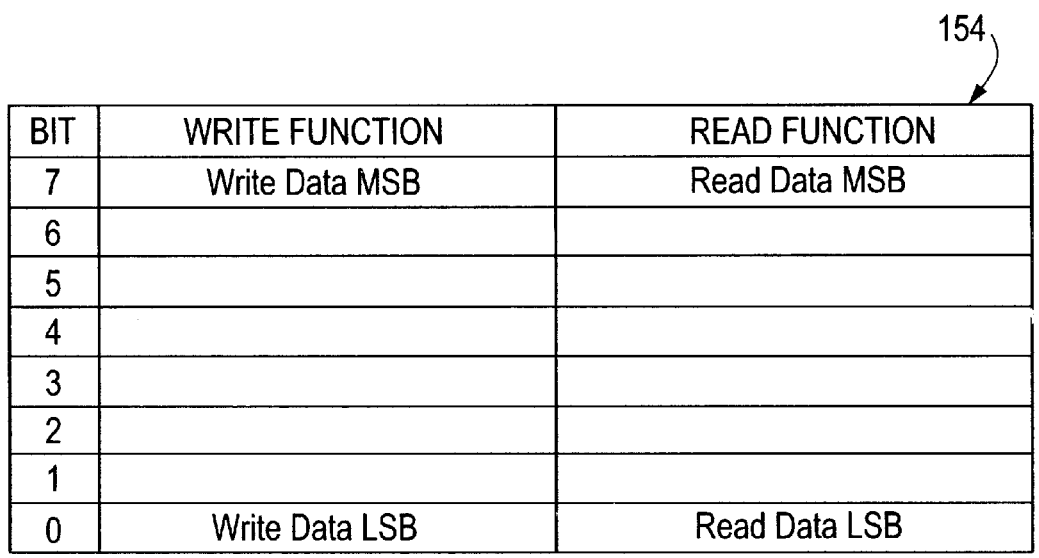
FIG. 11 is a schematic representations of the bus device pointer data register of FIG. 1.

As discussed above with respect to the bus controller registers 108, the various bits in each of the bus device registers has a different interpretation if a write or a read function is being performed. As depicted in FIG. 1, the bus device 104 includes 8 separate data registers. In particular as depicted in FIG. 5, register 140 is a bus device control and status register. If a write function is being performed, bits 0 and 1 are reserved and set to 0. Bit 2 is a bus device control and status register mux select bit which determines the function of the next register, 142, which may be the bus control and status register expansion or the bus device configuration code. If bit 2 is set to 1 then register 142 will be the bus control status register expansion. Bit 3 of register 140 enables interrupts for both a write and a read function, and bit 4 invokes a self test for a write function and provides a self test complete flag for a read function. Bits 5 and 6 provide initialization of a home device for a write function and an initialization complete flag for a read function. Bit 7 is a reset bit for a write function and an internal error flag for a read function.

As discussed above, if bit 2 of the write function of register 140 is set to 1 then register 142 is interpreted as depicted in FIG. 6A as register 142A. In particular, bits 0–2 force a calculated error which is a cascade collision error for bit 0, a parity error for the next read cycle for bit 1 and a write parity error for this cycle for bit 2 for a write function and provide an error indication for a cascade bus collision error, bit 0, a self-test error, bit 1, and a calculated bus write error, bit 1, for a read function. Bits 3–7 are not defined for a write function. However for a read function, bit 3 indicates an internal or CRC error has occurred, bit 4 indicates a bus synchronization error has occurred, bit 5 and 6 indicate that a server following error has occurred and bit 7 indicates an interrupt overrun error.

If the bit 2 in the register 140 is set to 0 then the register 142 is interpreted as depicted in FIG. 6B as register 142B. In particular, for a write function there is no defined interpretation for the bits 0–7. If a read function is being performed bits 0–1 indicate the board revision number, bits 2–14 indicate the Xilink configuration data, bits 5–7 indicate the board configuration data.

Registers 144 and 146 provide the bus device output register. In particular, register 144 and 146 depicted in FIGS. 7A and 7B respectively provide up to 16 bits of data to be written across the three-wire network. In the case of a read function being performed, the bits in the registers 144 and 146 provide the function of "read what you wrote", in which the bits of data that were transferred to the bus controller are stored in the corresponding register. Register 148 is depicted in FIG. 8 and is the bus device input register. If a write function is being performed there is no defined interpretation of the bits in register 148. If a read function is being performed bits 0–7 provide the input data written to the register and the bus device from the bus controller.

Register 150 is a bus device interrupt mask enable register. In particular, register 150 during a write function provides interrupt enable bits 0–7. If a read function is being performed there is no defined interpretation for the bits contained within this register.

Register 152, as depicted in FIG. 10, is the bus device pointer register that points to one of a plurality of predetermined memory locations 151 contained in the memory space of the processor 122. In particular, if a write function is being performed by the register, bits 0–6 provide the actual pointer location of 0–128 pointer locations. Bit 7 is a pointer freeze flag indicating that no increment is to be performed on the pointer locations. If a read function is being performed, bits 0–6 contain the current pointer location. Bit 7 is a "read what you wrote" for bit 7 in the write function.

Register 154 is the bus device data read write register for pointer data. If a write function is being performed then bits 0–7 contain the write data value to be written to a particular pointer location, and if a read function is being performed the data bits 0–7 contain data read from a particular pointer location.

The pointer locations described with respect to FIG. 10 are typically contained within the memory space of the particular bus device 104. In one embodiment, the pointer locations 0–63 are reserved for external devices and the pointer locations 64–127 are reserved for internal registers such 4 channel A-D inverters. FIG. 12 depicts a particular embodiment of data registers receiving data from various external devices (not shown) but is written and read from the various pointer locations. In particular, as depicted in FIG. 12 for a pointer location of 40 (hex) through pointer location 4B (hex) various A/D channels (not shown). In this embodiment, pointer locations 00 (hex) through 08 (hex) can be used to store data from 3 16 bit encoder latches (not shown).

As depicted in FIG. 1 the bus device 104 can include a plurality of Flash memory 156. In one embodiment, the Flash memory support is included in four of the 1218 pointer locations. In one embodiment, the pointer location 20 (hex) includes the Flash memory write enable and sector select data, the pointer location 21 (hex) includes upper half pointer register, the pointer location 22 (hex) includes the lower half 10 pointer register, and pointer location 23 (hex) includes the Flash memory data register for reading or writing from/to the Flash memory 156.

In one embodiment the bus controller is a robot controller and one or more bus devices correspond to one or more robotic applications. The various robotic applications can include data collected from various sensors or provide data such as threshold data to various sensors. In one embodiment, the pointer locations 00 (hex) to 08 (hex) can receive the bits from one or more encoder latches (not shown) configured and arranged to encode the various aspects of the robotic applications. Pointer location 10 (hex) can contain data configured and arranged to select a particular latch encoder. In this embodiment, there may be up to 3 latch encoders having up to 24 bits each. The pointer locations 40 (hex) through 44 (hex) can receive data from a variety of sensors, such as vacuum sensor 1 and 2, pointer locations 40 (hex) and 41 (hex) respectively, a temperature sensor, pointer location 42 (hex), a humidity sensor, pointer location 43 (hex), and a threshold value for a vacuum sensor, pointer location 44 (hex). The pointer locations 44 (hex) through 47 (hex) can write the upper and lower threshold data from the vacuum sensor 1 and 2, pointer locations 44 (hex) and 45 (hex) respectively, and the upper and lower threshold values for the temperature sensor, pointer location 46 (hex). Pointer location 47 (hex) can be used to write upper and lower threshold data for the humidity sensor. Pointer locations 48 (hex) through 4B (hex) can receive A/D data to be read by the bus device from a house vacuum sense, pointer location 48 (hex) and up to three sensors to be determined, pointer locations 49, 4A, and 4B (hex).

When transferring data between the bus controller 102 and the bus device 104, the bus controller transmits a single data packet onto the transmit wire. The transmitted data packet includes a command code, the bus device selection code, and the register selection code as described above. If the command code is write command, the selected bus device receives the data packet and transfers the data contained therein into the selected register. If the command code is a read command, the selected bus device retrieves the data from the selected data register, forms a data in packet using the data from the selected data register and transmits the data packet to the bus controller 102.

Those of ordinary skill in the art should further appreciate that variations to and modification of the above-described methods and apparatus for fast serial communication system may be made without departing from the inventive concepts disclosed herein. Accordingly, the invention should be viewed as limited solely by the scope and spirit of the appended claims.

What is claimed is:

1. An apparatus for providing serial data communication between a first robot bus device and a second robot bus device, the apparatus comprising:
   a first robot bus device acting as a bus controller;
   a second robot bus device;
   a three wire network connection including a first data line to transmit data from the first robot bus device to the second robot bus device and a second data line to transmit data from the second robot bus device to the first robot bus device, and a clock line having a clock signal thereon for providing a clock signal from the first robot bus device to the second robot bus device;
   the first robot bus device coupled to the second robot bus device via the three wire network connection; and
   a multi-bit data packet that is a data out packet including, a data synchronization portion, a command portion, a receiver selection portion, a data portion, a parity portion, and an error portion.

2. The apparatus in claim 1 wherein the data packet further includes:
   the data synchronization includes 3 bits for packet synchronization;
   the command portion includes 2 bit field command select;
   the receiver selection portion includes 6 bits;
   the data portion includes 8 bits of data;
   the parity portion includes 1 bit of even parity for the 8 bits of data, 1 bit for parity error detect for the 8 bits of data, and 1 bit of even parity; and
   the error portion includes 1 bit for bus collision status.

3. The apparatus of claim 2 further including a null portion.

4. The apparatus of claim 3 wherein the null portion includes 3 bits.

5. The apparatus of claim 2 wherein the 6 bit receiver selection portion includes 3 bits to select the second robot bus device and 3 bits to select a one of a plurality of registers therewithin.

6. The apparatus of claim 1 wherein the first robot bus device further comprises:
   a first robot bus device control and status register that stores a plurality of bus device selection data; and
   a first robot bus device data register that stores a plurality of data transferred to and from the second robot bus device.

7. The apparatus of claim 1 wherein the second robot bus device further comprises;
   a second device data register that stores a plurality of data to be transferred to and from the first robot bus device.

8. A method for transferring data between a first robot bus device and a second robot bus device having a plurality of data registers, the first robot bus device including a control register for storing second robot bus device selection data, second robot bus device register selection data, and command data, and a data transfer register for storing data to be transferred to and from the selected bus device, the second robot bus device plurality of data registers including a data transfer register for storing data to be transferred to and from the first robot bus device, the method comprising:
   providing second robot bus device selection data;
   storing said second robot bus device selection data in said control register;
   providing second robot bus device register selection data;
   storing said second robot bus device register selection data in said control register;
   providing data to be transferred;
   storing said data to be transferred in said first robot bus device data register; and
   forming a data packet including a plurality of packet data including, a data synchronization portion, a command portion, a receiver selection portion, a data portion, a parity portion, and an error portion.

9. The method of claim 8 wherein the data packet includes
   a data synchronization portion including 3 bits in a predetermined synchronization pattern for packet synchronization;
   the command portion including 2 bits as a command code read from the first robot bus device control register;
   the receiver selection portion including 6 bits;
   the data portion including 8 bits of data to be transferred read from the first robot bus device data transfer register;
   the parity portion 1 bit of even parity for the 8 bits of data, and 1 bit for parity error detect for the 8 bits of data and the 1 bit of even parity; and
   the error portion 1 bit for bus collision status; and
   transferring the data packet from the first robot bus device to the second robot bus device over a serial link including a first data transfer line and a clock line having a clock signal thereon.

10. The method of claim 9 wherein the data packet further includes a null data portion.

11. The method of claim 10 wherein the null data portion includes 3 bits.

12. The method of claim 10 wherein the 6 bit includes a bus robot device selection portion and a register selection portion.

13. The method of claim 12 wherein the bus robot device selection portion includes 3 bits and the register selection portion includes 3 bits.

14. The method of claim 9 wherein the command code is a write command, the method further including the steps of:
   receiving the data packet by the second robot bus device corresponding to the second robot bus device selection data;
   reading the 8 bits of data in the device packet; and storing the 8 bits of data in the register corresponding to the second robot bus device register select data.

15. The method of claim 9 wherein the command code is a read command, the method further including the steps of:
   receiving the data packet by the second robot bus device corresponding to the second robot bus device selection data;
   reading the data stored in the register corresponding to the second robot bus device register select data;
   forming a read 26 bit packet data including,
   3 bits for packet synchronization;
   8 bits indicating status of each of the second robot devices;
   8 bits of data;
   1 bit of even parity for the 8 bits of data
   1 bit for parity error detect for the 8 bits of data and 1 bit of even parity;
   1 bit for bus collision status; and
   3 bit as a null field; and
   transferring the read 26 bit data packet to the first robot bus device.

* * * * *

UNITED STATES PATENT AND TRADEMARK OFFICE
CERTIFICATE OF CORRECTION

PATENT NO. : 6,732,207 B2  Page 1 of 1
DATED : May 4, 2004
INVENTOR(S) : Gary Watts et al.

It is certified that error appears in the above-identified patent and that said Letters Patent is hereby corrected as shown below:

Column 6,
Line 22, "half 10 pointer" should read -- half pointer --; and

Column 8,
Line 54, "devices;" should read -- bus devices; --.

Signed and Sealed this

Twentieth Day of December, 2005

JON W. DUDAS
*Director of the United States Patent and Trademark Office*